United States Patent [19]

Howarth

[11] Patent Number: 5,274,824
[45] Date of Patent: Dec. 28, 1993

[54] KEYRING METAPHOR FOR USER'S SECURITY KEYS ON A DISTRIBUTED MULTIPROCESS DATA SYSTEM

[75] Inventor: David I. Howarth, Middlesex, Mass.

[73] Assignee: Bull HN Information Systems Inc., Billerica, Mass.

[21] Appl. No.: 662,861

[22] Filed: Mar. 1, 1991

[51] Int. Cl.$^5$ ............................................. G06F 13/14
[52] U.S. Cl. .............................. 395/725; 364/DIG. 1; 364/259.2; 364/281.3; 364/285; 364/285.4; 364/286.4; 364/286.5
[58] Field of Search ............... 395/725, 575, 650, 200; 380/4; 371/53

[56] References Cited

U.S. PATENT DOCUMENTS

| | | | |
|---|---|---|---|
| 4,439,830 | 3/1984 | Chueh | 395/425 |
| 4,525,780 | 6/1985 | Bratt et al. | 395/425 |
| 4,688,169 | 8/1987 | Joshi | 395/725 |
| 4,845,715 | 7/1989 | Francisco | 371/53 |
| 4,864,494 | 9/1989 | Kobus, Jr. | 395/575 |
| 4,941,175 | 7/1990 | Enescu et al. | 380/4 |
| 4,962,449 | 10/1990 | Schlesinger | 395/325 |

FOREIGN PATENT DOCUMENTS 4010094 10/1991 Fed. Rep. of Germany .

OTHER PUBLICATIONS

Proceedings of 1988 IEEE Symposium on Security and Privacy, Apr., 1988, pp. 39-49, "Extended Discretionary Access Controls".
Computer Technology Review, vol. 6, No. 1, 1985, pp. 191-199 "Operating Systems Offer Security Features To Control Computer Access".
European Search Report for corresponding EPO patent application 92103363.5.

Primary Examiner—Debra A. Chun
Attorney, Agent, or Firm—Gerald J. Cechony; Lewis P. Elbinger; John S. Solakian

[57] ABSTRACT

In a distributed data system in which processes running in trusted systems whose results may be proprietary or sensitive in nature may be invoked by operators at remote, untrusted workstations, and in which said processes are provided with locks which do not permit proprietary or sensitive actions unless a request includes a key matching the lock, a method of associating keys with operators is based on each operator's presenting his ID and a valid password at the workstation at the time he logs on to the system, verifying his password in a trusted system, correlating his ID with a role or group of roles he is authorized to fulfill, and retrieving and storing in the memory of the trusted system, associated with the operator's ID, a list of keys (a "keyring") for each of those roles. The operator's ID is appended to every request he invokes, a process containing a lock interrogates the stored list and will not grant a proprietary action unless the stored list contains a key matching the lock.

4 Claims, 5 Drawing Sheets

KEYRING METAPHOR FOR USER'S SECURITY KEYS ON A DISTRIBUTED MULTIPROCESS DATA SYSTEM

BACKGROUND OF THE INVENTION

1. Field of the Invention

The invention pertains to networks of distributed digital data systems, particularly to methods of managing security keys in such networks when the potential number of combinations of keys may be unmanageably large.

2. Description of the Prior Art

The invention is embodied in an EFTPOS (Electronic Funds Transfer / Point of Sale) system such as the one described in U.S. Pat. No. 4,879,716, "Resilient Data Communications System", issued Nov. 7, 1989 to McNally et al (hereinafter, "the McNally patent").

A large number of point-of-sale (POS) terminals are distributed over a very large geographical area, perhaps on the order of an entire continent. A communications network is provided which transports data over the entire geographical area, and all the POS terminals are connected to it, through telephone lines and intelligent line concentrators (called network access controllers, or "NACs"). Also connected to the communications network are computers operated by financial institutions.

The POS terminals are typically placed into service by merchants, who then accept transactions from consumers who carry plastic credit cards or debit cards which bear in machine-readable form an identification of a financial institution which maintains an account for the consumer, and an identification of that account. The primary function of the system is to forward from the POS terminals to the financial institution computers information identifying a consumer's account and a transaction the consumer wishes to make in that account, and to return from the financial institution to the POS terminal either an acceptance or rejection of that transaction.

A merchant wishing to place a POS terminal into service typically obtains the necessary equipment (the terminals and associated modems, etc.) from a "service provider" organization. Such an organization might have no role in the EFTPOS system beyond that of providing equipment, or larger merchants and financial institutions might function as service providers; in that case the latter role is kept separated from the former.

In addition to line concentrators for POS terminals and computers of financial institutions being connected to the communications network as described above, two other classes of equipment are connected to it which exist ancillarily to the system's aforementioned primary function: network management systems (NMSs), and management workstations (WSs). (WSs are not specifically discussed in the McNally patent, but are at the heart of SAFs 12 and are attached to NMSs 14 to provide an interface between operators and NMSs.)

NMSs are responsible for overall control and monitoring of the EFTPOS system; WSs are used by the network provider organization and service provider organizations to control and monitor particular equipment and communication paths for which they are responsible. As described in the McNally patent, the NACs can be dynamically reconfigured and can report their present status; operators and administrators at the WSs may enter commands to reconfigure the systems or commands requesting information on the current status of the systems. Commands originating at a WS are passed to an NMS for verification that the action or information requested is within the purview of the requesting organization, and are acted upon by the NMS following that verification.

The WSs and NMSs have software running in them to effect the entry of such commands and the responses to them. Each particular type of command typically invokes a particular path through the software, causing the execution of executable paths that are provided to perform particular functions required for a particular command. A software entity dedicated to a discrete function is known in the software arts as a "process".

WSs and NMSs are distributed throughout the geographical area served by the system. The NMS in a particular region of the geographical area generally exercises direct control and monitoring of the POS terminals and NACs in that particular region. A request pertaining to such a terminal or NAC and originating from a process in a WS or NMS in a different region must be forwarded over the communications network to a process in the NMS having cognizance of the target NAC, and a response must be forwarded back to the requesting process.

Software running in the NACs controls the operation of the NACs and, in turn, their control over the terminals and phone lines coming in to the NACs. Communication network 8 may be used for the distribution of new or replacement software from NMSs to the NACs.

Operators at NMSs and WSs potentially have the ability to alter system operational parameters, and to interrogate operational parameters and historical information. In a system whose purpose is to handle a large number of financial transactions, compositely involving enormous amounts of money, these capabilities provide an exposure to potential security problems based on bogus or fraudulent system manipulation. A second area of security exposure inheres in that operators may represent many different, and often competing, business organizations (the national telephone company and local telephone companies, various financial institutions, various service provider organizations, etc.). It can not safely be assumed that there would be no attempts by an operator to access the proprietary information of another organization, or even to sabotage the operations of another organization.

A solution to this problem, well known in the prior art, is to incorporate "locks" in processes that access sensitive or proprietary information, and to require a would-be accesser to present the correct "key" before granting him access. In typical software implementations, this is accomplished by requiring a process initiated at the behest of a would be accesser to present a number or word which must match a number or word known to the process which is being requested to provide access. Ancillarily, presentations of invalid keys may initiate procedures designed to detect attempts at penetration.

An operator upon logging on to an NMS (through a WS colocated with the NMS, or remotely located at an SAF) has presumably passed physical security checks to gain access to those facilities, and is typically further required to know certain passwords controlled by the entities which manage the NMSs and WSs in order to log on. The purpose of the logon checks is to establish the user's identity with a high level of confidence. The user then enjoys a level of access and privilege defined by the keys he has been granted.

The EFTPOS system in which the present invention is embodied is of such complexity that approximately 300 locks are required throughout the system to provide a reasonable assurance of security. The number of key combinations is astronomically high, and would be extremely difficult or perhaps impossible to work with in practice.

SUMMARY OF THE INVENTION

The present invention overcomes this difficulty in the prior art by mechanizing a "keyring" metaphor in which a manageable number of operator roles are identified, a determination is made regarding which keys are required for each such role, and a keyring containing those keys is defined for each role an operator is permitted to assume when he presents his credentials for logging on to the system. The keyrings for each operator are retrieved from mass storage when he logs on, and are retained in memory, indexed by the operator's ID. A subsequent request by the operator which requires presentation of a key is mechanized by accessing his keylist in memory and determining whether it contains the requisite key.

OBJECTS OF THE INVENTION

It is thus a general object of the present invention to improve the security of distributed data systems.

It is a particular object of the present invention to improve the manageability of security key distribution in a complex distributed data system in which the potential number of keys is unmanageably large.

This and other objects of the invention will be apparent to those skilled in the art after reviewing the following description of the preferred embodiment and the appended drawings, wherein:

DESCRIPTION OF THE PREFERRED EMBODIMENT

Figure 1:
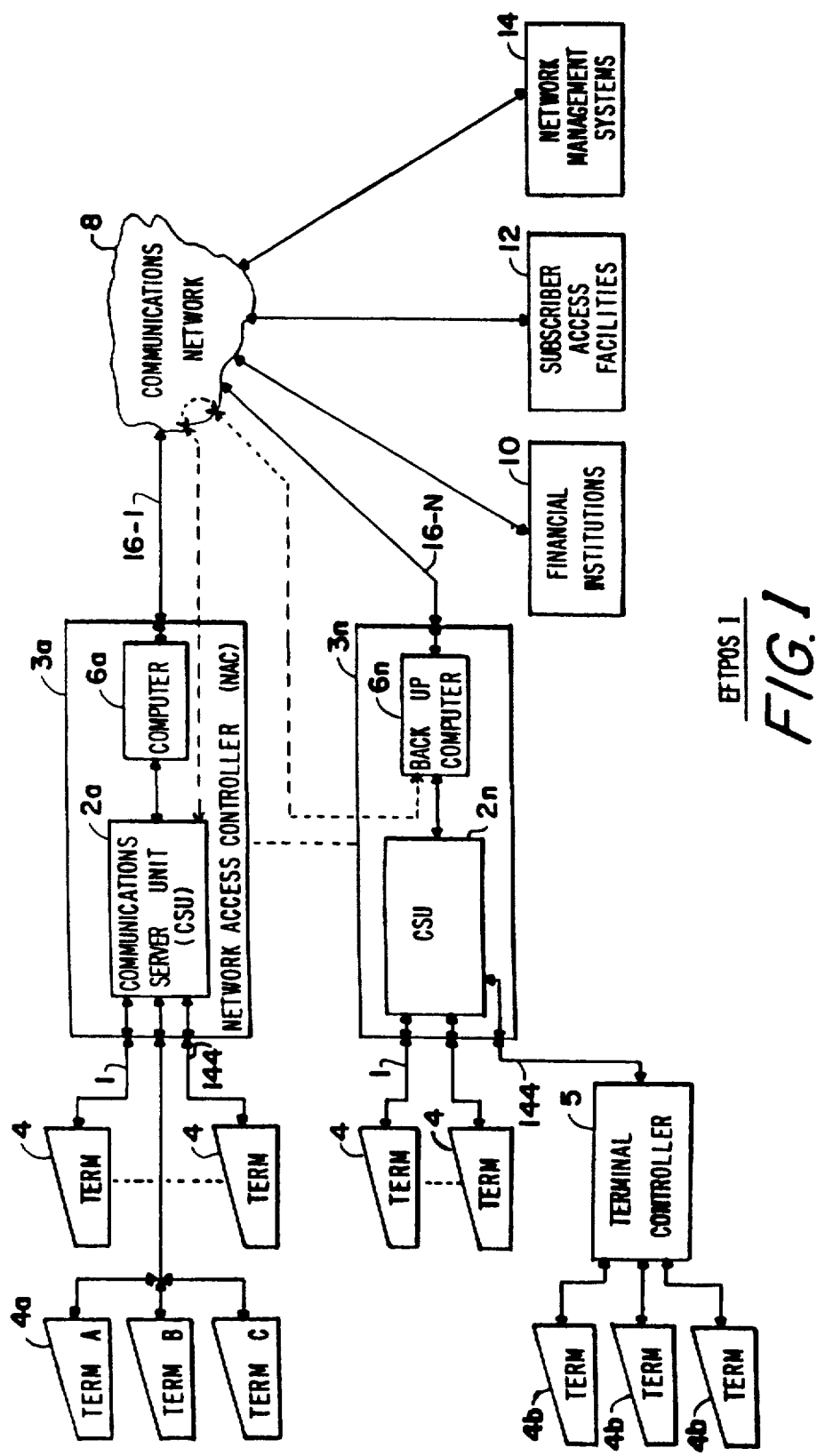
FIG. 1 provides an overview of the distributed data system in which the present invention is embodied.

FIG. 1, reproduced here from the McNally patent, provides an overview of the system in which the present invention is embodied, showing NACs 3, terminals 4, communications network 8, financial institutions 10, SAFs 12, NMSs 14, and communication lines 16. As noted above, workstations (WSs) are at the heart of SAF's 12; also, WSs are attached to NMSs 14.

Figure 2:
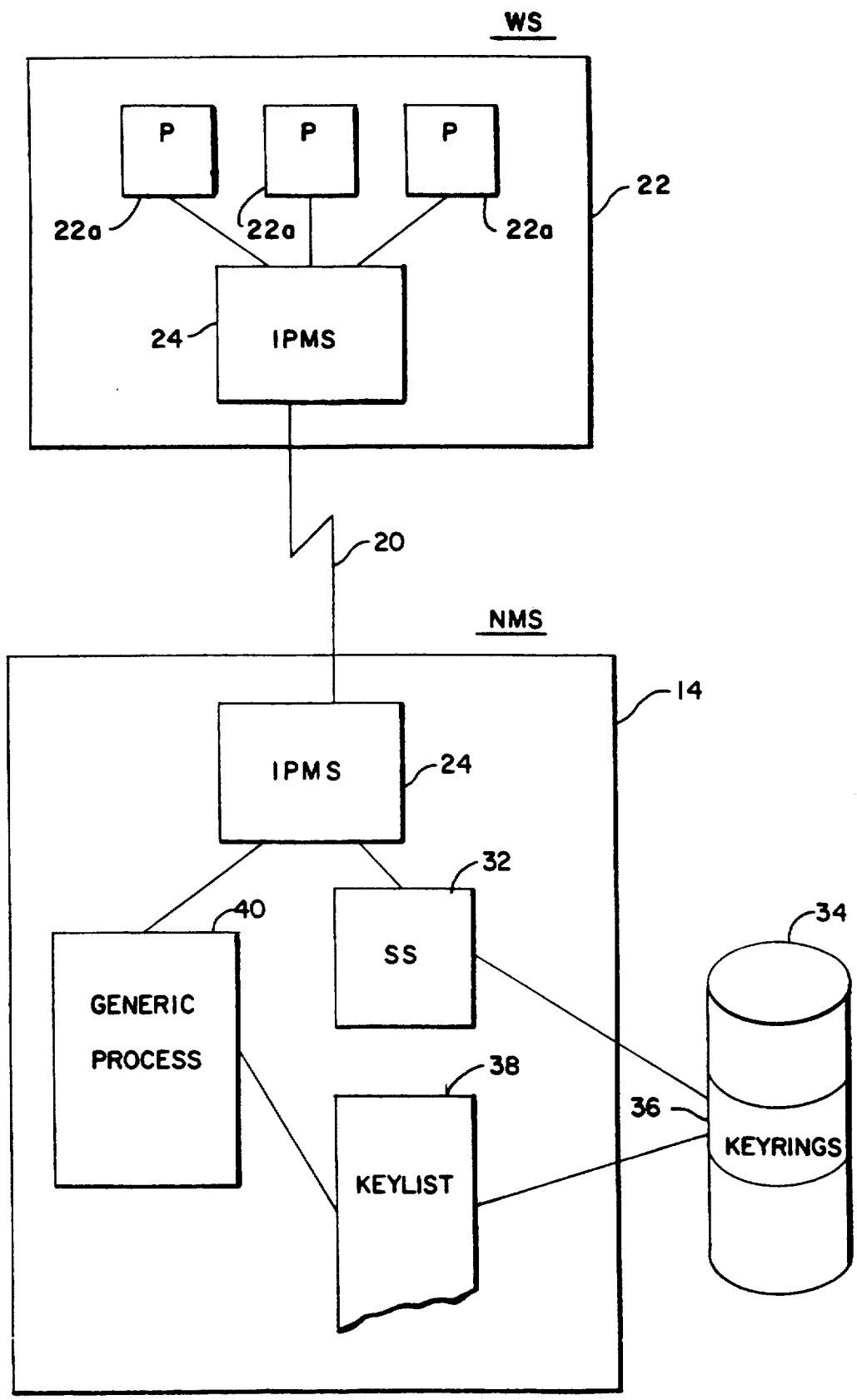
FIG. 2 provides further detail of the portion of the system involving the present invention.

FIG. 2 shows further detail of those portions of the system involved with the present invention. Introduced in FIG. 2 is workstation (WS) 22; WSs are at the heart of SAFs 12. WS 22 is shown as being connected to NMS 14 by communication link 20; this link is conceptual, and may be mechanized through a communications line 16 and communications network 8 (shown in FIG. 1) if WS 22 is remote from NMS 14, or through a LAN if WS 22 is colocated with NMS 14, or through telephone lines in any case. The present embodiment includes several NMSs 14 and a large number of WSs 22; one of each is sufficient to expostulate the present invention.

Every NMS and WS includes an instance of the distributed inter-process message service (IPMS) 24, which passes messages between processes resident in different physical equipments. The operation of IPMS 24 is transparent for purposes of understanding the present invention.

Physical access to a WS 22 is under the control of the organization placing it into service, which may be such as a service provider, a local telephone company, the network provider, etc. Such organization designates personnel who will be authorized to be operators of the WSs, decides how much authority each operator shall have, and assigns account numbers, user ID's, and passwords for the identification of such operators. This information is entered by administrators of the network provider and stored on NMS 14, correlated by user ID.

Preparatory to making the determination of how much authority each operator shall have, a discrete number of operator "roles" are identified. It is then determined what processes and classes of data each operator role requires to access, and the keys that will be required to access those processes and data classes are stored in lists, a list associated with each role. By way of metaphor, each such list is known as a "keyring". Since there can be hundreds of different keys across the system, this approach of assigning lists of keys by role is far more manageable than assigning custom lists of keys for each individual operator. When a person is designated an operator by his organization, a role or list of roles he shall be authorized to fill is provided.

When an operator logs on, which he does by typing commands on a keyboard (not shown, associated with WS 22), he is prompted to enter his user ID, account number, and password, which are forwarded to NMS 14. There, a security services (SS) process 32 is invoked, which compares the presented log-on information with the stored version; if comparison succeeds, record is made in the NMS (and distributed to all other NMSs, not shown in FIG. 2) that the user is validly logged on. It is noteworthy that this comparison is performed at an NMS, "a trusted machine", as opposed to the WS which may be located at an isolated or remote location and thus may be susceptible to tampering. There remains the possibility that someone has misappropriated the operator's logon information and is fraudulently logging on in his stead; this must remain the responsibility of physical security procedures at the WS location.

The SS process 32 retrieves the role or list of roles the operator may fulfill, and access storage medium 34, whence it retrieves the keyrings (lists of keys) associated with those roles and stores them in memory within the NMS for subsequent use by processes therein. They are retrieved from a file 36 on storage medium 34, to be described in further detail below in conjunction with FIG. 3. They are stored in memory in a list known as KEYLIST 38, associated with the operator's user ID, and they remain there until the operator logs off; there is thus an entry in KEYLIST 38 for each operator presently logged on, associated with his user ID, and containing the keys to which that operator has been granted access. The makeup of KEYLIST 38 will be described in further detail below in conjunction with FIG. 4.

Other NMSs are informed that the user has signed on, and build his keylist independently.

An operator may then enter a request or command which may result in one of processes 22a running in his WS to post a message (which will be transported transparently by IPMSs 24 to a process in an NMS, requesting from the latter process either information or an action that may affect system operation. (For example, it might be a request to remove from service a phone line connecting a POS terminal to a NAC.) Process 40 in FIG. 2 is presented as representative of such a process. When the message from process 22a in the WS is passed by IPMS to process 40 in the NMS, the instance of IPMS in the NMS appends to the message a string comprising the operator's user ID, account number, and corporate affiliation.

The process 40 contains within its code "locks" on actions that are deemed sensitive, such as retrieving proprietary information or altering system configuration. In the present embodiment, each such lock consists of a string consisting of four ASCII characters: a requester must possess a key consisting of the same string in order to get past the lock. In the present invention, process 40 performs a lookup in KEYLIST 38 of the keyring(s) provided for the operator. (It will be recalled that the operator's user ID was appended by IPMS to the incoming request, and that entries in KEYLIST are indexed according to user ID.) If they keyring(s) thus retrieved contain a key matching the current lock, the action will be permitted to proceed; if not, it will be denied.

Figure 3:
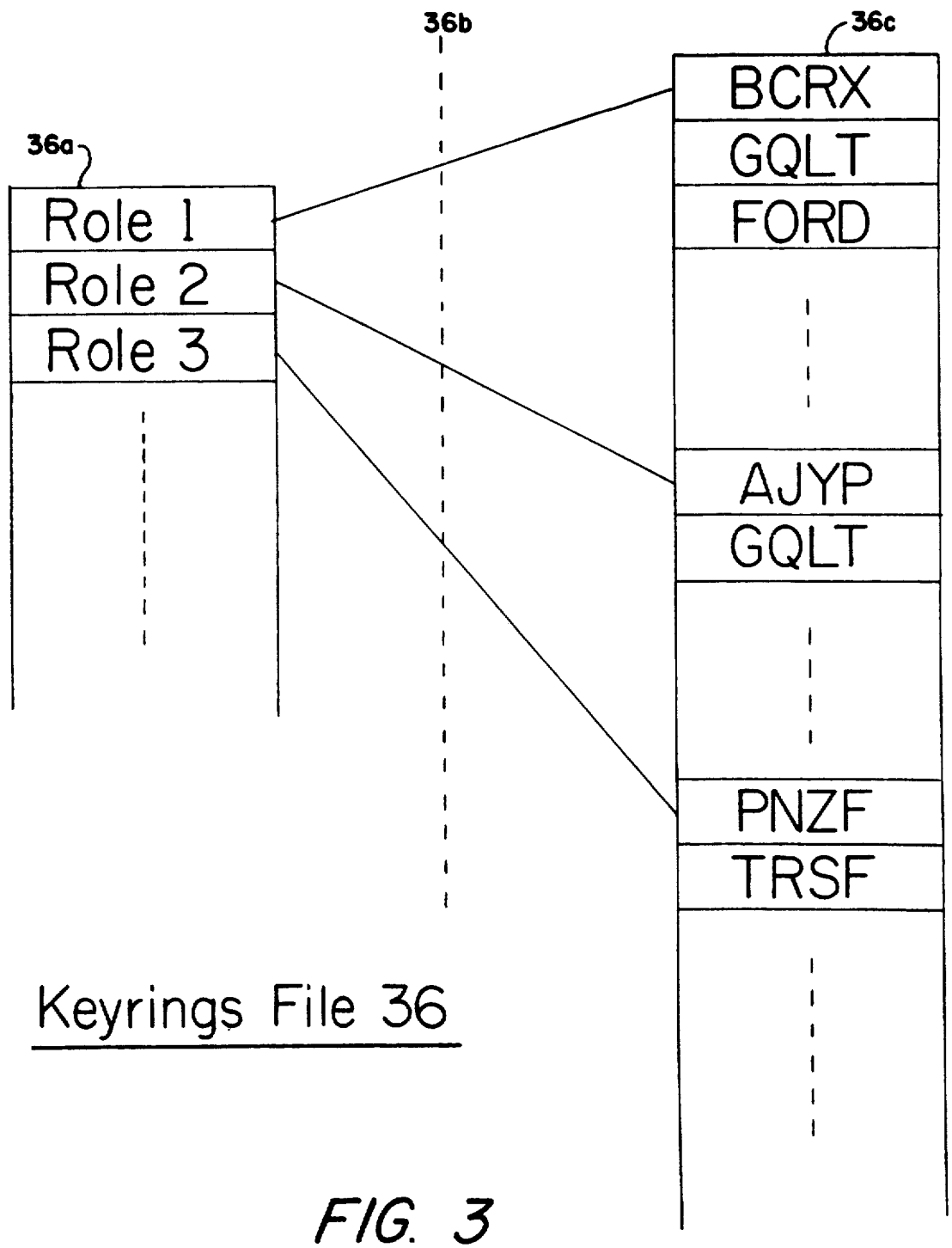
FIG. 3 shows detail of a file on storage medium containing lists of keys indexed by operator role.

FIG. 3 shows further detail of file 36, which contains the keyrings for each operator role. It includes an index portion 36a which contains designations of the various possible roles operators may fulfill. By means well known in the software arts, associated with each role is a "pointer" 36b which contains information determinative of the initial position of a list of keys authorized to an operator who is designated to fulfill that role. In the process of logging on an operator, the list of roles he is designated to fulfill (this list is not shown) is accessed by SS 32, which accesses list portion 36c as thus indexed through index portion 36a to retrieve the keyring(s) (i.e., list(s) of keys) authorized to the role(s) designated to the operator.

Figure 4:
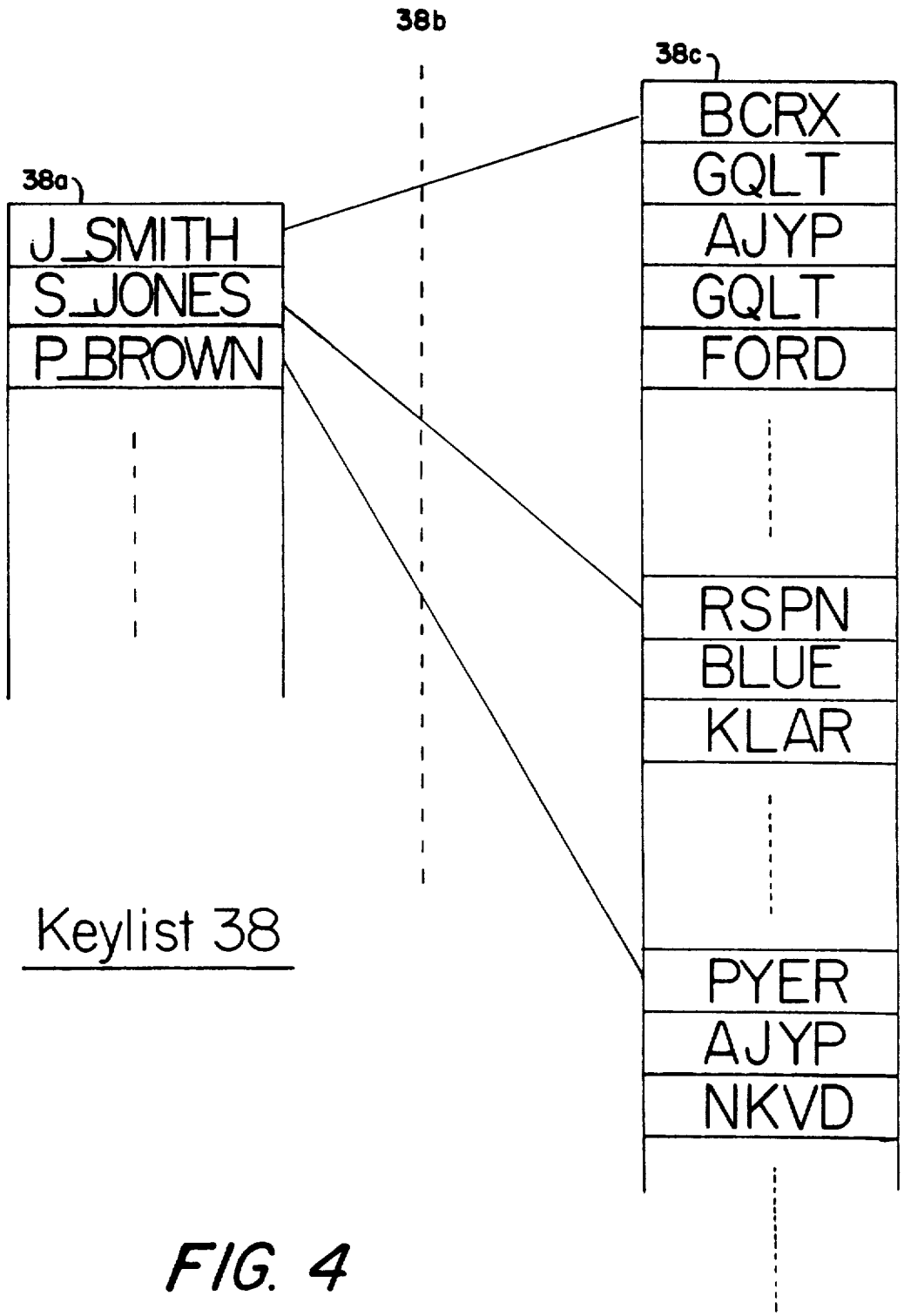
FIG. 4 shows detail of a memory-resident list containing keys authorized to each presently logged-on operator.

SS 32 records the keys thus retrieved in KEYLIST 38 in the memory of NMS 14. KEYLIST 38 is depicted in FIG. 4. SS 32 records an index portion 38a which contains the user IDs of the presently logged-on operators. The user IDs may take a number of forms; in the present embodiment, they are seen to be direct derivatives of the operators' names. Associated with each user ID is a pointer 38b which indicates the memory location of the start of a list of keys authorized to that operator by the keyring retrieval described above.

The keys depicted in FIGS. 3 and 4 are arbitrarily chosen for illustration. It is seen in FIG. 3 that roles 1 and 2 both contain the key GQLT. This would indicate an overlap of function between roles. It is assumed that operator J_SMITH is authorized to function in roles 1 and 2; it is thus seen in FIG. 4 that his list of keys within 38c contains two occurrences of key GQLT; this will not grant him any more powers than would a single occurrence of the key.

When process 40 is acting on a request from an operator and encounters a lock in its code, it will interrogate KEYLIST 38 as indexed by the operator's name (which, as described above, has been appended to the command which process 40 is working on), and consult the list of keys authorized to the operator; if a key matching the lock is found, process 40 will continue to process the command; if none is found, processing of the command is aborted.

Within the code of process 40 there may be further checks based on the operator's corporate affiliation or account number. For example, if an operator is employed by service provider A, and has been assigned a key which empowers him to take telephone lines (1 through 144 on FIG. 1) out of service, there is an implication that he may only take such action on lines in the purview of service provider A and not of any other service provider.

Under the scheme of the present invention, which keeps all the keys granted to all presently logged-on operators in memory where they may be rapidly retrieved, locks can be more numerous and can be applied to smaller blocks of code than was possible under prior-art methods, which would require I/O access for key retrieval.

Figure 5:
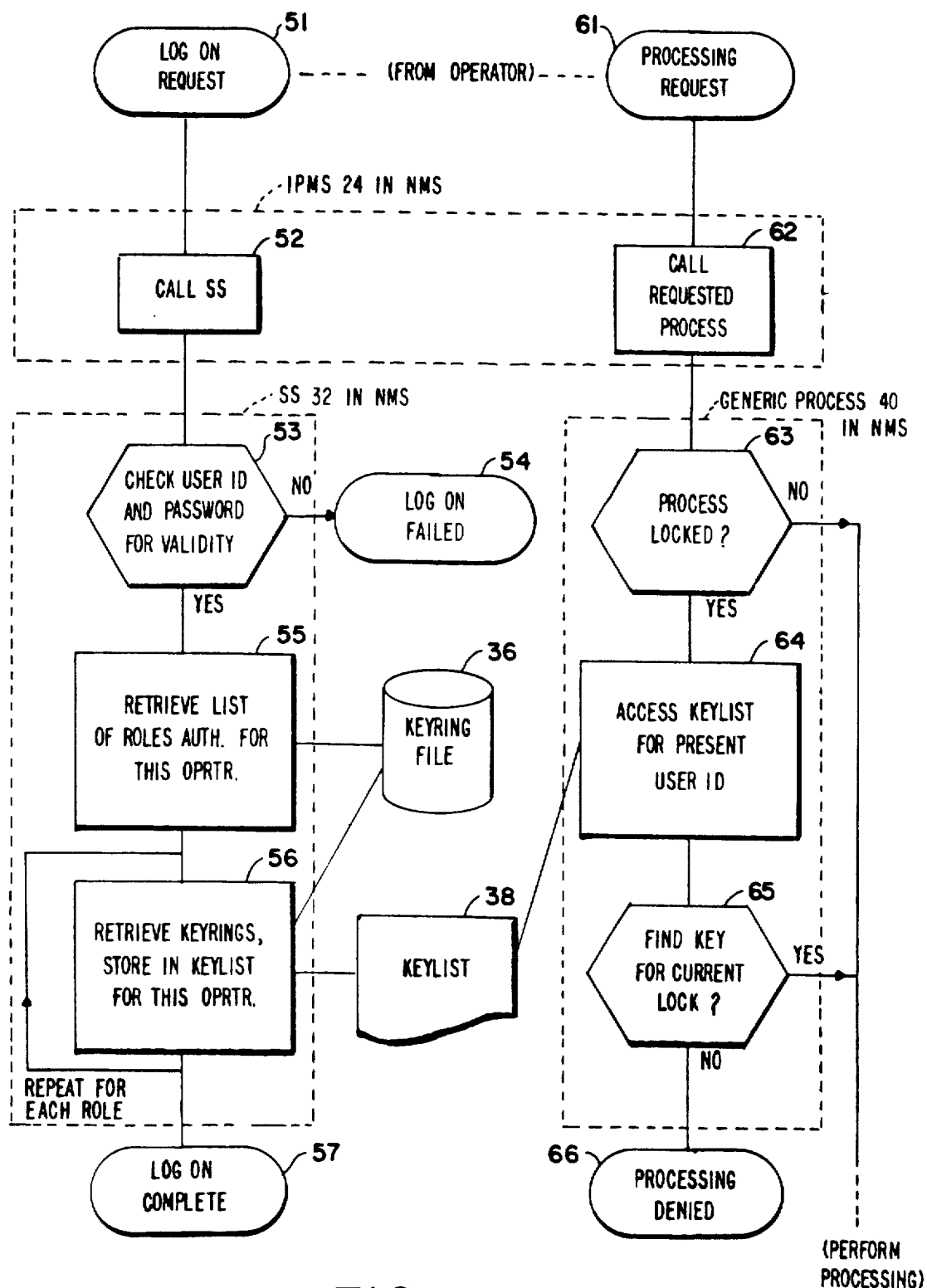
FIG. 5 is a flow chart of the invention.

FIG. 5 provides a high-level flow chart of the invention. Block 51 connotes the initiation by an operator of a logon request. The request is passed to IPMS 24 (in an NMS 14) in which block 52, detecting that the present request is a logon request, calls the Security Services (SS) process 32.

Within SS 32, block 53 checks the UserID and password (included with the logon request) for validity by comparing with a prestored password (not shown) associated with that User ID. In the event of successful password comparison, block 55 is reached which retrieves from keyring file 36 (discussed above in connection with FIG. 3) the list of roles that have been authorized to each operator, indexed by UserID. For each such role, block 56 retrieves from keyring file 36 the "keyring" or list of keys associated with that role, and stores them keyed by UserID in keylist 38 (discussed above in connection with FIG. 4). The logon process is then complete.

Block 61 connotes a request from an operator for some particular processing to be performed on the system. The request reaches block 62 in IPMS 24, and calls the requested process, represented in FIG. 2 and in FIG. 5 by "Generic Process" 40; all represented processes contain equivalents of blocks 63, 64, and 65.

Block 63 checks whether the process is "locked". If it is, block 64 accesses keylist 38, indexed by the present requester's UserID (which accompanies the request message) to retrieve the list of keys the present requester is authorized to use. Block 65 checks whether any of the keys (4-character strings, as discussed above) thus retrieved matches the key required by the present lock; if yes, the requested processing is performed; if no, the processing is denied.

The invention may be embodied in other forms without departing from the spirit thereof. The invention is intended to be embraced by the appended claims and not limited by the foregoing embodiment.

I claim:

1. A computer-implemented method for associating protection mechanism codes ("locks") for securing the utilization of protected processes, available for use in a data processing system by users of said system, with utilization permission codes ("keys") presented to said protected processes when said users require use of said protected processes, wherein, an active store of said system holds a respective list of keys authorized to each active user, said lists being indexed in said active store by unique identifiers associated with said users; said method being characterized by:

when one of said active users makes a request for use of one of said protected processes, a first process operating in said system appends the identifier of said user to said request and forwards the request, with accompanying identifier, to said one protected process;

a second process, in response to receipt of said accompanying identifier, accesses said active store and retrieves the respective key list from said active store;

said second process performs a comparison of the individual keys of said retrieved key list with the lock of said one protected process to determine whether any key of said retrieved key list matches said lock of said one protected process; and if said comparison determines a match between the keys compared, said one protected process is placed into execution; but if said comparison determines no match between the keys compared, said one protected process is not placed into execution.

2. The computer-implemented method of claim 1, wherein said second process is said one protected process.

3. A computer-implemented method for associating protection mechanism codes ("locks") for securing the utilization of protected processes, available for use in a data processing system by users of said system, with utilization permission codes ("keys") presented to said protected processes when said users require use of said protected processes, wherein, a backing store of said system holds a plurality of different lists of keys to be authorized to the active users, said method being characterized by:

when one of said users logs on said system by providing information, including a unique identifier of said one user, to said system, a first process operating in said system, in response to receipt of said identifier, accesses said backing store, retrieves at least one of said key lists from said backing store, and enters said retrieved key lists into an active store of said system, said retrieved lists being indexed in said active store by said unique identifier;

when said one user subsequently makes a request for use of one of said protected processes, a second process operating in said system appends the identifier of said user to said request and forwards the request, with accompanying identifier, to said one protected process;

a third process in response to receipt of said accompanying identifier, accesses said active store and retrieves the respective key lists from said active store;

said third process performs a comparison of the individual keys of said retrieved key lists with the lock of said one protected process to determine whether any key of said retrieved key lists matches said lock of said one protected process; and if said comparison determines a match between the keys compared, said one protected process is placed into execution; but if said comparison determines no match between the keys compared, said one protected process is not placed into execution.

4. The computer-implemented method of claim 3, wherein an additional storage of said system holds lists of representations of the possible functions (roles) each potential user may be authorized to perform in said system, said lists of roles being indexed in said additional storage by the identifiers of the respective potential users, and said backing store further holds, for each of said roles, a respective representation of the location in said backing store of a key list corresponding to said role; and said first process in response to receipt of said identifier, accesses said additional storage and retrieves the respective role list from said additional storage, and employs each role in said retrieved role list to access said respective location representation in backing store and, using said respective location representation, accesses said backing store to retrieve the respective key list.

* * * * *